United States Patent [19]

Herold et al.

[11] Patent Number: 5,755,892
[45] Date of Patent: May 26, 1998

[54] WASTE DISPOSAL OF CONTAMINATED DRILL CUTTINGS FROM GEOLOGICAL DRILLING USING DRILLING FLUID SYSTEMS CONTAINING MINERAL OIL

[75] Inventors: Claus-Peter Herold, Mettmann; Heinz Mueller, Monheim; Stephan von Tapavizca, Erkrath, all of Germany; Malcolm Ellice, Aberdeen; Douglas John Grimes, Beaconsfield, both of Great Britain

[73] Assignees: Henkel Kommanditgesellschaft auf Aktien, Duesseldorf; Baroid Limited, Aberdeen, both of Germany

[21] Appl. No.: 783,770

[22] PCT Filed: Jan. 8, 1993

[86] PCT No.: PCT/EP93/00022

§ 371 Date: Oct. 14, 1994

§ 102(e) Date: Oct. 14, 1994

[87] PCT Pub. No.: WO93/13882

PCT Pub. Date: Jul. 22, 1993

Related U.S. Application Data

[63] Continuation of Ser. No. 256,495, Oct. 14, 1994, abandoned.

[30] Foreign Application Priority Data

Jan. 13, 1992 [DE] Germany .................... 42 00 502.7

[51] Int. Cl.⁶ .................................................... B08B 3/08
[52] U.S. Cl. ........................... 134/2; 134/19; 134/25.1; 134/25.5; 134/40; 175/66
[58] Field of Search .................. 134/2, 19, 25.1, 134/25.5, 26, 30, 40; 175/65, 66, 70, 206

[56] References Cited

U.S. PATENT DOCUMENTS

| | | | |
|---|---|---|---|
| 4,040,866 | 8/1977 | Mondshine | 134/26 |
| 4,209,381 | 6/1980 | Kelly, Jr. | 175/66 |
| 4,242,146 | 12/1980 | Kelly, Jr. | 134/7 |
| 4,374,737 | 2/1983 | Larson et al. | 252/8.5 |
| 4,481,121 | 11/1984 | Barthel | 252/8.5 |
| 4,606,283 | 8/1986 | DesOrmeaux et al. | 110/250 |
| 5,156,686 | 10/1992 | Van Slyke | 134/40 |
| 5,244,566 | 9/1993 | Bond | 134/40 |

FOREIGN PATENT DOCUMENTS

| | | |
|---|---|---|
| 3213268 | 4/1982 | Germany . |
| 3842703 | of 1990 | Germany . |
| 3842659 | 6/1990 | Germany . |
| 4018228 | 6/1990 | Germany . |
| 3903784 | 8/1990 | Germany . |
| 3903785 | 8/1990 | Germany . |
| 3907391 | 9/1990 | Germany . |
| 3907392 | 9/1990 | Germany . |
| 3911238 | 10/1990 | Germany . |
| 3911299 | 10/1990 | Germany . |
| 4003028 | 2/1991 | Germany . |
| 4019266 | 1/1992 | Germany . |
| 4024659 | 2/1992 | Germany . |
| 4024892 | 2/1992 | Germany . |
| 4024658 | 4/1992 | Germany . |
| 4102908 | 8/1992 | Germany . |
| 8201737 | 5/1982 | WIPO . |

OTHER PUBLICATIONS

Journal of Petroleum Technology, 1984., 975–981, "New Drilling Fluid Technology–Mineral Oil Mud".

World Oil, "Potassium Modified Lime Muds Improve Shale Stability", Nov. 1983.

Golf Publishing Co., "Composition and Properties of Oil Well Drilling Fluids".

Society of Petroleum Engineers of AIME, "New Base Oil Used in Low–Toxicity Oil Muds", Jan. 1985.

*Primary Examiner*—Jan Ludlow
*Attorney, Agent, or Firm*—Ernest G. Szoke; Wayne C. Jaeschke; Real J. Grandmaison

[57] ABSTRACT

Described is the use of ecologically compatible, and more particularly of biologically degradable, oils having flash points of above 80° C. for washing mineral oil-loaded drill cuttings prior to the disposal thereof by off-shore and/or on-shore deposition. For the use as wash oils there are preferred aerobically and/or anaerobically degradable low-viscosity oils are employed which are also suitable for being used as a mixture component of the continuous oil phase of W/O invert drilling fluids.

13 Claims, No Drawings

WASTE DISPOSAL OF CONTAMINATED DRILL CUTTINGS FROM GEOLOGICAL DRILLING USING DRILLING FLUID SYSTEMS CONTAINING MINERAL OIL

This application is a continuation of application Ser. No. 08/256,495 filed on Oct. 14, 1994 now abandoned.

BACKGROUND OF THE INVENTION

1. Field of the Invention

Oil-based drilling fluids and W/O invert drilling muds based thereon are of outstanding importance in the modern technology of geological development, for example for the exploitation of crude oil and/or natural gas deposits. The use of the new drilling fluid systems is of particular importance in the marine sector, but it is not limited thereto. The technology of drilling by the use of oil-based W/O invert systems finds general use also in terrestrial drilling, for example in geothermal drilling, water drilling, in carrying out geo-scientific drilling and in drilling in the field of mining.

Liquid sweeping systems of the type concerned here which are by far superior to the water-based systems, more particularly, in the sectors of off-shore drilling or in the penetration of water-sensitive layers, are generally used as so-called invert emulsion muds which consist of a three-phase system: Oil, water and finely divided solids. They are preparations of the type of W/O emulsions, i.e. the aqueous phase has been heterogeneously distributed in a finely dispersed state in the continuous oil phase. For stabilizing the system altogether and for establishing the desired performance properties, a multiplicity of additives is provided, more specifically emulsifiers or emulsifier systems, weighting agents, fluid-loss additives, alkali reserves, viscosity modifiers and the like. As to details, reference is made, for example, to the publications P. A. Boyd et al., "New Base Oil Used in Low-Toxicity Oil Muds", Journal of Petroleum Technology 1985, 137 to 142, and R. B. Bennett, "New Drilling Fluid Technology-Mineral Oil Mud", Journal of Petroleum Technology 1984, 975 to 981, as well as the literature quoted therein.

Oil-based drilling fluids were initially composed of diesel oil fractions containing aromatic constituents. For the purposes of detoxification and reducing the ecological problems thus created it was then proposed to use hydrocarbon fractions largely free from aromatic compounds—today also denoted as "non-polluting oils"—as the continuous oil phase; hereto cf. the literatur cited above. Nevertheless, even an elimination of the aromatic compounds from the mineral oils only leads to a restricted reduction of the environmental problems caused by the drilling fluids of the above type. Here, particular difficulties arise for the waste disposal of the so-called "cuttings" removed from the sweeping fluid phase, i.e. the rock cuttings formed upon drilling and conveyed upwardly along with the drilling fluid. In practice, these amounts of rock cuttings produced are separated by one or more step(s) of sieving and/or by further separating steps such as centrifugation from the major amount of the recycled drilling fluid phase. The resulting removed drill cuttings have been wetted with considerable amounts of the oil-based drilling fluid phase. If drilling fluid systems based on non-degradable mineral oils as the continuous oil phase are used, any disposal of drill cutting waste by dumping it down to the bottom of the ocean is now out of consideration. Ecological investigations have revealed that contaminations by mineral oils are still present even a long time after they were deposited and still can adversely affect the particularly sensitive marine eco-system. The same problems will arise upon work with water-based O/W emulsion fluids.

2. Discussion of Related Art

The relevant technolgy has for some time recognized the significance of a use of ecologically compatible and especially of biodegradable oil phases in connection with the composition of oil-containing drilling fluid systems. Thus, the U.S. Pat. Nos. 4,374,737 and 4,481,121 describe oil-based drilling fluids wherein non-polluting oils are reported to have been used. As the non-polluting oils there have been mentioned, besides mineral oil fractions which are free from aromatics, vegetable oil of the peanut oil, soybean oil, linseed oil, corn oil and rice oil types and also oils of animal origin such as whale oil. Subsequent more detailed investigations have shown that the use as contemplated in prior art of readily degradable oils of vegetable and/or animal origin cannot be realized for practical reasons. The rheological properties of such oil phases can not be controlled over the temperature range as required in practice of from 0° C. to 5° C., on the one hand, up to 250° C. and higher, on the other hand.

Applicants, in a greater number of published, and in part still unpublished, protective rights describe proposals for replacing the mineral oil fractions by ecologically compatible readily degradable oil phases. Among these, four different types of substitute oils have been presented which may also be used as mixtures. They include selected oleophilic monocarboxylic acid esters and corresponding polycarboxylic acid esters, at least largely water-insoluble alcohols which are fluid under the operation conditions, corresponding ethers and selected carbonic acid esters. In summary, reference is made here to the published older applications DE-A-38 42 659, DE-A-38 42 703, DE-A-39 07 391, DE-A-39 07 392, DE-A-39 03 785, DE-A-39 03 784, DE-A-39 11 238, DE-A-39 11 299, DE-A-40 19 266 and DE-A-40 18 228. All of the printed publications mentioned here relate to the field of oil-based drilling fluid systems, especially of the W/O inverted type.

Today, oil-based drilling fluid systems based on the appropriate monocarboxylic acid esters and/or based on ethers of monofunctional alcohols have shown their value in practical use and have proven their manifold superiority over the mineral oil-based drilling fluids, especially of the W/O invert type. One of the important facilitations provided by working with ecologically compatible and, more specifically, bio-degradable oils of this kind is that it simplifies the disposal of the drill cuttings wetted with the oil fluid. If, for example, the rock cuttings separated by sieving and/or centrifugation are deposited on the bottom of the ocean, then the dumping area will not become polluted. The marine ecosystem remains substantially undisturbed; for example, the introduced ester-based drilling fluid systems will virtually have been decomposed after comparably short periods of time.

The teaching of the invention proceeds from the object, on the ground of the knowledge as available today on the ecological compatibility of the biologically degradable oil phases in systems of the type concerned here, to open up the possibility in practical operation to employ drilling fluid systems containing mineral oil, and especially W/O invert fluid muds predominantly based on mineral oils or mineral oil fractions, respectively, without having to compromise the advantages as obtained in particular for the deposition of the drill cuttings with the bio-compatible systems described

3 above. The use of mineral oils or of mineral oil fractions, respectively, as the main component of the invert fluid systems - but also in water-based fluids of the O/W type—may be desirable, for example under the aspects of availability and/or aspects of costs, if at the same time it can be reliably guaranteed that undesirable contaminations of the environment, and more particularly of the marine ecosystem, by these per se ecologically toxic sweeping liquids are avoided. It is general practice up to date, to transport the mineral oil-contaminated cuttings to land and there to clean—for example by washing them with aqueous surfactant solutions—and/or to deposit them.

The teaching of the invention proceeds from the concept of that the object aimed at is to be attained via a route that has not been described hitherto: The invention to solve the problems outlined above by an exchange of the oil phase on the rock cuttings removed from the drilling fluid. The incompatible mineral oil-based oil phase wetting the rock cuttings is to be replaced especially by an oil phase based on ecologically compatible, and more particularly biologically degradable, oils. However, this additional measure is to be rendered possible at an economically reasonable and tolerable expenditure of material and money.

3. Description of the Invention

Accordingly, the invention relates to the use of ecologically compatible, and more particularly of biologically degradable, oils having flash points of above 80° C. for washing mineral oil-loaded drill cuttings prior to a disposal thereof by off-shore and/or on-shore deposition. As the ecologically compatible wash oils according to the invention there are used, more specifically, aerobically and/or anaerobically degradable low-viscosity oils which themselves are suitable due to their product properties—for example rheology, volatility, toxicology, miscibility and the like—for being used in drilling fluids and, more specifically so, as a mixture component of the continuous oil phase of W/O invert drilling fluids.

Particularly suitable ecologically compatible and especially biologically degradable wash oils fall within the substance classes as initially quoted of oleophilic monocarboxylic acid esters and oleophilic polycarboxylic acid esters, corresponding ethers or alcohols and/or the partial ethers thereof, as well as oleophilic carbonic acid esters, such as those described in detail in Applicants' above-mentioned older applications. These aerobically and/or anaerobically degradable oils as preferred according to the invention are also designated hereinbelow as "oxygen-functionalized wash oils" or as "O-functionalized wash oils".

DETAILED DESCRIPTION OF THE INVENTION

The teaching of the invention proceeds from the following concept:

The amounts of drill cuttings, which under the conditions of operation in practice are to be continuously removed from the oil-containing drilling mud loaded with drilling cuttings contain considerable amounts of oil phase on their surfaces, if a W/O invert fluid is employed as the oil-based drilling fluid. In the case contemplated by the invention, said drilling fluid contains substantial amounts—mostly at least predominant amounts—of mineral oil. The drilling fluid, after the cuttings have been removed therefrom, is recirculated into the bore hole. This circulating stream of the mineral-oil based drilling fluid may be prevented from coming into undesirable contacts with the sensitive eco-system.

4

According to the invention, the waste disposal—which so far has been problematic—of the mineral oil-contaminated cuttings is now effected by washing same with O-functionalized wash oils. Hereby the ecologically incompatible mineral oils is displaced from the cuttings, whereby the oil load on the cuttings is replaced by the biologically degradable O-functionalized wash oil. In this form, the cuttings now wetted with aerobically and/or anaerobically degradable oils may now without scruples be deposited off-shore and/or on-shore. Thus, the facilitation aimed at in the removal of the drill cuttings has been ensured.

The economic efficiency of such an operational step—illustrated by way of the case of the particularly important W/O invert-based fluid systems—is optimized by the following preferred elements of acting according to the invention: The amount of drill cuttings upwardly conveyed with the circulating stream of the W/O drilling fluid is known to be relatively small, relative to the circulated amount of the W/O invert mud. It usually amounts to at best a few percent by volume. Thus, comparably low are the amounts of O-functionalized wash oils required for washing said oil-loaded cuttings; in these considerations it is further to be noted that the progress in drilling achieved in the course of the operation makes it necessary to continuously replenish the circulating stream with further additional quantities of W/O invert mud.

In one preferred embodiment of the invention there are employed wash oils which do not only satisfy the requirement of biological compatibility and degradability in the respective eco-system. The preferred wash oils according to the invention have been selected additionally under the aspect of that they themselves are capable of taking over the function of the continuous oil phase in this drilling fluid, at least as a mixture component in admixture with the mineral oils of the W/O invert mud. The advantage of acting within the meaning of this provision according to the invention will be immediately apparent: The used-up wash oils contaminated with mineral oil are quite simply disposed of by feeding them into the circulating stream of the W/O invert mud and, hence, making them a component of the drilling fluid itself. Thus, the teaching according to the invention allows the biologically compatible and degradable O-functionalized wash oils to be utilized to an optimum degree in a comparably low amount, while the essentially mineral oil-based drilling fluid systems are maintained without any need to compromise the crucial advantage of the facilitated disposal of the drill cuttings. Comparable considerations are applicable to the operation using water-based emulsified mineral oil-containing O/W emulsion fluids.

The selection of particularly suitable biologically degradable wash oils is governed by the double functionality demanded therefor within the scope of the invention. The wash oils, on the one hand, as preferredly low-viscosity organic liquids, are desired to be readily miscible with the mineral oil phase, e.g. the W/O invert mud, in the course of the washing operation, so that an efficient scouring of the cuttings with limited amounts of the O-functionalized wash oil will become possible. On the other hand, these wash oils will have to be efficient components of the continuous oil phase of the invert mud, once they will have been admixed to the drilling fluid. Thus, preferred O-functionalized wash oils exhibit pour points and setting points of not above 5°0 C., and especially of below 0° C. Particularly suitable may be wash oils which have pour points and setting points of −5° C., and especially of below −15° C. Biodegradable oils suitable in practice often possess solidification values of below −25° C. to −30° C. The viscosity of the wash oils may be important especially in the first step of the use thereof, i.e. in the washing operation of the cuttings loaded with, e.g., invert mud. Here it may be convenient for developing the optimum solvent and wash oil qualities, to employ liquid phases which are readily mobile and also in lower temperature ranges have a sufficiently low viscosity. There is usually applicable that the O-functionalized wash oils should be oils that are flowable and pumpable in the temperature range of from 0° C. to 5° C. and which possess preferred Brookfield (RVT) viscosities of below 80 mPa.s, and preferably of below 60 mPa.s. Particularly suitable wash oils may exhibit viscosities of up to about 45 mPa.s in the temperature range as indicated.

In this connection, however, another additional preferred working element of the invention is to be taken into consideration, as follows: In an important embodiment of the invention, the washing procedure, still to be described in detail hereinbelow, of the mineral oil-loaded cuttings can be carried out at elevated temperatures, especially in the temperature range up to 100° C. and preferably within the temperature range of from about 35° C. to 80° C. The drilling fluid loaded with cuttings will already reach elevated temperatures at a limited depth of the bore hole, so that in the course of practical operation the discharged fluid and, thus, also the cuttings contained therein, is at a temperature level of from 35° C. to 60° C. In one preferred embodiment, the teaching according to the invention makes particular use thereof in washing the cuttings by that the O-functionalized wash oil is also heated at comparable or even higher temperatures for subsequent use in the washing procedure. This in a per se known manner involves a reduction in the viscosity of the wash oil and, thereby, the improvement of its function demanded here as washing agent or solvent, respectively.

O-Functionalized Washing Oils Preferred According to the Invention

In summary, general reference may once more be made here to Applicants' previously published—and in part still unpublished—older applications as throughout relating to the field of oil-base drilling fluid muds, and especially those of the W/O invert type. From these applications there are in detail derivable suitable esters of monocarboxylic acids, suitable esters with a concomitant use of polycarboxylic acids, suitable ethers as well as suitable oleophilic alcohols including the partial ethers thereof and suitable oleophilic carbonic acid esters. All of the subject matters of these mentioned older applications relating to the certain types of the respectively disclosed O-functionalized oil phases are incorporated herein by reference.

Especially important representatives of the wash oils within the scope of the invention are specified within the classes of oleophilic esters of carboxylic acids and of oleophilc ethers. More particularly, oleophilic carboxylic acid esters may be especially suitable representatives, due to their ability to undergo an aerobic biological degradation as well as an anaerobic biological degradation. Today, so-called sea-floor tests are available to the art which tests furnish evidence of the safety of the disposal of ester-loaded cuttings resulting from drilling fluids of the kind as here concerned.

There is consistently applicable to the oil phases and/or oil mixed phases as to be preferably used according to the invention that flash points of at least about 100° C., and preferably flash points above about 135° C. are required for reasons of a safe operation. Values that are distinctly higher, especially those in excess of 150° C., may be particularly expedient.

There is further consistently applicable to those various oil phases usable within the scope of the invention that are potentially susceptible to hydrolysis, not only that the wash oils themselves, i.e. the respective selected ester oil or ester oil mixture, must be ecologically compatible, but also that no toxicological and especially no inhalation-toxicological danger will be induced upon a partial saponification in practical use. Within the scope of the mentioned older applications there has been described in great detail that here, more particularly, the various representatives of ester oils are referred to, with the monofunctional alcohols from the esters formed being again of particular significance here. In comparison to polyfunctional alcohols, the lower members of the monofunctional alcohols are highly volatile, so that here a partial hydrolysis may cause exposure to secondary danger. Accordingly, in the classes of the various ester oils those monofunctional alcohols included in the use, or the moieties of such alcohols, have been chosen so that they have at least 6 carbon atoms, and preferably at least 8 carbon atoms, in the molecule thereof. Hydrolysis-resistant ethers may be particularly important for the practical use as components of the continuous phase of the drill hole treating agents—subsequently to the use thereof as washing and/or cleaning agents for the cuttings to be stripped of mineral oil contaminations.

As ester oils which are ecologically compatible and biologically degradable, there have proven to be useful, more specifcally, esters of monocarboxylic acids which then, in a preferred embodiment of the invention, are derived from at least one of the following subclasses:

a) Esters of $C_{1-5}$-monocarboxylic acids and mono- and/or polyfunctional alcohols, whereof the moieties of monohydric alcohols comprise at least 6 carbon atoms and preferably at least 8 carbon atoms and the polyhydric alcohols preferably have from 2 to 6 carbon atoms in the molecule, b) Esters of monocarboxylic acids of synthetic and/or natural origin comprising from 6 to 16 carbon atoms, and more specifically esters of aliphatic saturated monocarboxylic acids and mono- and/or polyfunctional alcohols of the kind mentioned in a), c) Esters of olefinically mono- and/or polyunsaturated monocarboxylic acids having at least 16, and especially 16 to 24 carbon atoms and especially monofunctional straight-chain and/or branched alcohols.

Starting materials for recovering numerous monocarboxylic acids falling under these subclasses, especially those having a higher number of carbon atoms, are vegetable and/or animal fats and oils. There may be mentioned tallow, coconut oil, palm kernel oil and/or babassu oil, especially as feedstock for the recovery of monocarboxylic acids of the prevailing range up to $C_{18}$ and of essentially saturated components. Ester oils of vegetable origin based on olefinically mono- and optionally poly-unsaturated carboxylic acids of the range of $C_{16-24}$ are, for example, palm kernel oil, peanut oil, castor oil, sunflower oil, and especially rapeseed oil. But also tall oil-based esters fall within this category of comparably highly mobile monocarboxylic acid esters comprising olefinically mono- and/or polyunsaturated moieties. In addition to such esters largely derived from natural material, components synthetically recovered are also important structural elements for ecologically compatible and bio-degradable oil phases on the side of the carboxylic acids as well as on the side of the alcohols.

Particularly important monocarboxylic acid esters for the use according to the invention have been described in the older applications DE-A-38 42 659 and DE-A-38 42 703, both of which are incorporated here by reference. The olefinically unsaturated esters described in the first-mentioned one of these two printed publications, with respect to the composition thereof, are members of the above-mentioned subclass c), while the especially important esters according to the DE-A-38 42 703 belong to the above-mentioned subclass b) referring to suitable monoesters. Here of interest are in the first place esters that are flowable and pumpable within the temperature range of from 0° C. to 5° C.—of monofunctional alcohols having up to 12 carbon atoms and aliphatically saturated monocarboxylic acids having from 12 to 16 carbon atoms or mixtures thereof with minor quantities of other monocarboxylic acids. Ester oils of this kind which contain at least about 60%—relative to the mixture of carboxylic acids—of esters derived from aliphatic $C_{12-14}$-monocarboxylic acids may be especially suitable. An important representative of this class of ester oils is sold by one of Applicants under the trade name of "PETROFREE" (registered trademark).

Ester-based wash oils are always suitable, if a sufficient stability of the esters in the W/O invert muds can be expected under the conditions of use in practice. With a view to details, reference is made to the cited printed publications relating to the use of such esters in drilling fluids. If, under the operation conditions of the drilling fluids, high requirements are set for the stability to hydrolysis—for example in operating at high temperatures, especially in the temperature range from 150° C. upward—, then the use of ether oils as O-functionalized wash oil may be appropriate. A subsequent admixture to the mineral oil-based drilling fluid of these ether oils does not lead to any substantial restriction of the temperature resistance of such an invert fluid.

Among the wash oils of the type here concerned, preferred wash oils are ethers, mixed ethers and ether mixtures of monofunctional alcohols having at least 6 carbon atoms, which wash oils may also contain mixed ethers with incorporated moieties of polyhydric alcohols. Within the scope of the ether oils as contemplated here, particularly suitable are those compounds that are derived at least in part, and preferably at least predominantly, from straight-chain monofunctional alcohols, the ethers of the respective monoalcohols having from 8 to 12 carbon atoms and/or the mixed ethers thereof with di- to tetrahydric alcohols having straight-chain or branched carbon chains being particularly preferred.

In connection with the use of the ester oils and/or ether oils as particularly featured here, one significant additional advantage may be indicated here which, as the result of acting according to the invention, will become noticeable in the mineral oil-based drilling fluid—the W/O invert emulsion, but also in O/W emulsions—: Mineral oil-containing drilling fluids, in comparison to merely water-based drilling fluids, are known to possess clearly improved lubricating properties; nevertheless, the improvement in lubricity attainable with the mineral oil is limited. The use in practice of, for example, the ester-based drilling fluids based on the commercial product "PETROFREE" (registered mark) as mentioned has shown that substantial improvements in the lubrication in practical operation are attainable via the ester oil phase. Within the scope of the invention, the O-functionalized wash oils are ultimately added to the W/O invert fluid. Here they will become a constituent of the continuous oil phase which is mineral-based to at least a substantial proportion. Due to admixing the O-functionalized wash oils to said drilling fluid, the lubricating effect provided thereby is substantially improved, so that here also a significant secondary improvement may be utilized. This will matter not only for the regular operation of vertical drilling, but this improvement in the lubricity will gain further practical importance especially in inclined drilling, derived drilling and/or horizontal drilling.

It may be desirable, under the aspect of said improvements of an important product quality, as an O-functionalized wash oil to employ such a component of said type which, in admixture with the W/O invert main fluid, enables an optimization of the lubricating effect to be achieved. Here, wash oils comprising a plurality of ester groups, for example lower-viscosity polycarboxylic acid esters according to DE-A-40 19 266 and/or carbonic acid diesters according to DE-A-40 18 228 may be the preferred working agents.

It is only for the sake of completeness that it may be mentioned that any optional admixtures of the O-functionalized wash oils of the kind described in the cited older applications may be employed within the scope of the teaching according to the invention.

Further Details of the Teaching According to the Invention

Washing the drill cuttings contaminated with the mineral oil-based drilling fluid by using the biologically degradable O-functionalized wash oils may be performed batchwise and/or continuously in any optional manner. The process may be operated in one step or in more than one step. The washing procedure may make use of cocurrent streams, but also of counter-current streams of the material to be washed and the wash fluid.

In a preferred embodiment, washing may be carried out immediately after the recovery of the mineral oil-contaminated cuttings—i.e. in off-shore drilling, for example, on the platform—while, of course, the cuttings to be decontaminated may also be conveyed to a washing plant installed at some other place. The technologies employed in the washing process are in accordance with the knowledge from prior art, for example from cleaning oil-loaded and soiled earth or rock. Within the scope of the cleaning procedure according to the invention, it is advantageous that, as the wash oil, there is employed a non-aqueous hydrophobic oil phase, while not any aqueous surfactant solutions as have been proposed hitherto for washing the cuttings. The cuttings, more specifically the cuttings from off-shore drilling, are known to frequently be swellable clays which tend to undesirable secondary reactions upon a use of aqueous washing solutions.

Within a multistep process of washing cuttings, one particular embodiment of the invention deserves to be highlighted: This embodiment comprises at least two washing steps. In a first washing step, the cuttings to be cleaned are washed with a mineral oil-based oil phase. Here, more specifically, the hydrocarbon fraction may be used that conforms to the continuous oil phase from the mineral oil-based W/O invert emulsion. In this first washing step, an appropriately thin-fluid mineral oil in a particularly simple manner may successfully scour off the W/O invert mud remainders from the surface of the cuttings, so that in the subsequent washing step(s) only an exchange of the oil phases will have to be effected, i.e. the replacement of mineral oil by O-functionalized wash oils as taught by the invention. Also here, a full disposal of the respective wash oils is feasible in the described manner in that said wash oils are admixed to the W/O invert drilling where they will become a constituent of the continuous oil phase.

As has already been mentioned, it may be convenient to employ an elevated working temperature of up to 90° C., for example one within the range of from about 45° C. to 75° C., in the washing step(s), in order to render washing easier or allow a shorter washing period.

A further facilitation of work for the oil washing is provided by the following embodiment of the working step(s): Washing may be effected in the presence of elevated concentrations of emulsifiers, and especially emulsifiers of the W/O type. In this case it is convenient to admix the additional amount of emulsifier to the wash oil. This may considerably facilitate not only the absorption in the wash oil of the amounts of oil to be removed from the surface of the cuttings, but also the removal of the amounts of solids adhered thereto—weighting agents, fluid-loss additives and the like. In one embodiment, as the emulsifier additives there are conveniently chosen those W/O emulsifiers that are used in the drilling fluid for making the W/O invert mud. In practice suitable emulsifiers are, for example, nitrogen-containing compounds from the classes of polyamines and/or polyamidoamines. In this context, reference may be made to the pertinent literature of the art, for example G. R. Gray et al., "Composition and Properties of Oil Well Drilling Fluids", 4th Edition, Gulf Publishing Cp., Houston, London 1981, therein especially sub-chapter 7 and the literature cited therein. One particularly suitable type of emulsifier is the product sold by one Applicant under the tradename of "EZ-mul". Emulsifiers of the kind concerned here are commercially traded as highly concentrated preparations of the active ingredient and may be admixed to the wash oils, for example, in amounts of up to about 10% by weight, and preferably of from about 2.5 to 5% by weight—each relative to the oil phase.

However, especially suitable are also W/O emulsifiers having an improved ecological compatibility such as those described, more specifically, in the older applications by one of the Applicants DE-A-40 03 028, DE-A-40 24 658, DE-A-40 24 659, DE-A-40 24 892 and DE-A-41 02 908. In these older applications, there have been described, as W/O emulsifiers, selected emulsifiers based on ethers, on α-sulfofatty acid di-salts, on alkyl glycoside compounds, on surface-active ester sulfonate salts and on surface-active complex esters, respectively.

As to the continuous oil phase in the W/O invert fluid used in a particular drilling operation as a main working agent, in accordance with the teaching of the invention nearly any optional mixing ratio between mineral oil and O-functionalized wash oil may be employed. The selection will have to consider the actual conditions of the exchange of the oil phases and, if applicable, the process modification as mentioned above of a first washing step using a mineral oil-based wash oil and requiring just a final exchange of the oil phase on the cuttings' surfaces against the biologically compatible O-functionalized wash oils according to the invention. Even if the proportion of this O-functionalized wash oils in the invert drilling fluid during operation, eventually, may even comprise more than 50% by volume of the continuous oil phase, it is nevertheless preferred according to the invention—e.g. for economic reasons—to keep the proportion of the O-functionalized wash oils in the invert drilling fluid below 50% by volume, or by weight, of the continuous oil phase in the drilling fluid. It is readily possible here to work with by far lower amounts of the comparably more expensive ecologically compatible and biologically acceptable wash oils in the invert mud. The amount of esters, ethers and/or alcohols of the described types in the invert fluid, thus, may be less than 40% by weight, and preferably not more than about from 20 to 30% by weight, of the oil phase, and in particular not more than about from 5 to 15% by weight, of this oil phase. Even so, it will have to be ensured by means of the measures according to the invention that a mineral oil-free or virtually mineral oil-free solid material can be provided for the decontamination by a biological decomposition.

The composition of the invert drilling muds which are preferred to be predominantly mineral oil-based, moreover, corresponds to the conventional procedural instructions. Here, reference may be made to the older applications as intially set forth. Thus, there may be summarized, only by way of an excerpt, the following:

Invert drilling muds usually contain the finely dispersed aqueous phase in amounts of from about 5 to 50% by weight together with the continuous oil phase. In addition to the water contents, all of the additives provided for comparable types of fluids are to be taken into consideration. These additives may be water-soluble, oil-soluble and/or water- or oil-dispersible, respectively.

Conventional additives, in addition to the emulsifiers, include, for example, fluid-loss additives, soluble and/or insoluble materials to build-up structural viscosity, alkali reserve, agents for inhibiting an undesirable water exchange between drilled formations—e.g. water-swellable clays and/or salt layers—and the drilling fluid, wetting agents for an improved strike of the emulsified oil phase on solid surfaces, e.g. for improving the lubricating effect, but also for improving the oleophilic closure of exposed rock formations or rock surfaces, biocides, for example for inhibiting bacterial onset and growth on the emulsions and the like. In detail, reference is here to be made to pertinent prior art such as described, for example, in the technical literature as initially quoted; cf., more specifically, Gray and Darley, loc. cit., Chapter 11, "Drilling Fluid Components". Just by way of an excerpt, there may be quoted accordingly:

Finely dispersed additives for increasing the density of the fluid: Widely used is barium sulfate (baryte), but also calcium carbonate (calcite) or the mixed carbonate of calcium and magnesium (dolomite) are used.

Agents for a build-up of structural viscosity which simultaneously will act as fluid-loss additives: Here, bentonite or hydrophobized bentonite are to be mentioned in the first place. Also the concomitant use of organic polymer compounds of natural and/or synthetic origin may be of considerable importance in this connection.

Additives inhibiting the undesirable water-exchange with, for example, clays: Here to be considered are the additives known from prior art for oil- and water-based drilling fluids. These include, more specifically, halides and/or carbonates of the alkali and/or alkaline earth metals, whereof the potassium salts, optionally in combination with lime, may be of particular importance. Here, more recent proposals suggest the use of water-soluble lower alcohols such as glycerol and/or propanediol. Reference may also be made, for example, to the relevant publications in "Petroleum Engineer International", September 1987, 32–40, and "World Oil", November 1983, 93–97.

Alkali reserves: Here to be taken into consideration are inorganic and/or organic bases adjusted to match the total behavior of the fluid, and more particularly appropriate basic salts or hydroxides of alkali and/or alkaline earth metals as well as organic bases. Lime is an especially important representative of this class. Kind and amount of these basic components will have been mutually adjusted in a known manner.

Basically, the amounts of each of the auxiliary materials and additives is within the conventional range and, thus, may be learnt from the relevant literature as quoted.

EXAMPLES

The following investigations were made with a sample of drilling cuttings obtained from a current drilling operation on a field in the North Sea. Type of the drilling fluid: W/O invert drilling fluid, based on mineral oil. The mineral oil content of the cuttings contaminated with drilling fluid was 13.8% by weight.

One hundred grams of drilling cuttings contaminated with the drilling fluid are admixed with 100 g of a monocarboxylic acid ester oil (commercial product "PETROFREE") and the resulting product was thoroughly mixed in a beaker at 40° C. for 5 minutes. Then the solids were separated off by vacuum filtration over a glass nutsch filter. The product yield of the wet cuttings was 97.7 g.

The cuttings thus isolated were then subjected to a Soxhlet extraction with n-hexane for 8 hours. The resulting extract is carefully concentrated at room temperature.

Eight grams of the extract thus recovered were applied onto a silicagel column {column: inner diameter 20 mm; effective length 35 mm; filled with silicagel 60 from the company Merck, Darmstadt, Germany (particle size distribution from 0.063 to 0.2 mm)}. The applied mineral oil extract was then eluated through the silica gel column with 250 ml of n-hexane. The eluate was collected. In this procedure, the "PETROFREE" monocarboxylic acid ester and other polar components of the extract remained attached to the silica gel column.

From the eluate collected at the bottom of the silica gel column, the n-hexane was removed by blowing an air stream over the surface thereof until the weight of the residue remains constant. The purified mineral residue thus obtained was weighed and related to the initial amount of the total sample (100 g).

The mineral oil content thus determined of the cuttings washed with the monocarboxylic acid ester was 1.709 g, which amount corresponds to a residual mineral oil content of the drill cuttings of 1.75% by weight.

We claim:

1. The process of washing drill cuttings containing mineral oil prior to disposal of said drill cuttings comprising washing said drill cuttings with a wash fluid consisting essentially of biologically-degradable oils having a flash point of about 80° C. selected from the group consisting of oleophilic monocarboxylic acid esters, oleophilic polycarboxylic acid esters, corresponding ethers, alcohols, or partial ethers thereof, and oleophilic carbonic acid esters, whereby said mineral oil is removed by said biologically-degradable oils.

2. A process as in claim 1 wherein said biologically-degradable oils are compatible for use as a mixture component of the continuous oil phase of water-in-oil invert emulsion drilling fluids.

3. A process as in claim 1 wherein said biologically-degradable oils have pour points and setting points of below 0° C., and are flowable and pumpable at a temperature of from 0° C. to 5° C. and have a Brookfield viscosity of not more than 60 mPa.s.

4. A process as in claim 1 wherein said biologically-degradable oils are non-toxicological.

5. A process as in claim 1 wherein said biologically-degradable oils are esters selected from the group consisting of;

a) esters of $C_1$–$C_5$ monocarboxylic acids and mono- or polyfunctional alcohols, wherein said monofunctional alcohols contain at least 6 carbon atoms and said polyfunctional alcohols contain from 2 to 6 carbon atoms in the molecule, b) esters of saturated $C_6$–$C_{16}$ monocarboxylic acids and mono- or polyfunctional alcohols as in component a), and c) esters of olefinically mono- or polyunsaturated $C_{16}$–$C_{24}$ monocarboxylic acids and monofunctional or straight-chain branched alcohols.

6. A process as in claim 1 wherein said biologically-degradable oils are ethers selected from the group consisting of ethers derived from straight-chain monofunctional alcohols having at least 6 carbon atoms, ethers of monofunctional alcohols having 8 to 12 carbon atoms, and mixtures thereof.

7. A process as in claim 1 including adding said biologically-degradable oils and the mineral oil washed from said drill cuttings to an oil-based drilling fluid.

8. A process as in claim 1 including conducting at least one prewashing step prior to washing wherein a mineral oil-based washing oil is optionally employed in said at least one prewashing step.

9. A process as in claim 1 including conducting at least one prewashing step prior to washing wherein said at least one prewashing step is carried out with the use of mineral oil fractions employed in formulating drilling fluids, and wherein said mineral oil fractions are recycled to a drilling fluid stream after use in said prewashing step.

10. A process as in claim 1 wherein the wash fluid is flowed co-currently or counter-currently with respect to a flow of said drill cuttings at a temperature of up to about 100° C.

11. A process as in claim 1 wherein said wash fluid includes an emulsifier.

12. A process as in claim 1 wherein said washing is conducted immediately after recovering said drill cuttings during a drilling operation.

13. A process as in claim 12 wherein said washing is conducted on an oil drilling platform.

* * * * *